US008521763B1

(12) United States Patent
Haeg et al.

(10) Patent No.: US 8,521,763 B1
(45) Date of Patent: Aug. 27, 2013

(54) COMPUTER-BASED SYSTEM AND METHOD FOR PROCESSING DATA FOR A JOURNALISM ORGANIZATION

(75) Inventors: Andrew Haeg, Minneapolis, MN (US); Rajesh Kapur, Lakeville, MN (US); Maria Montello, Minneapolis, MN (US); Carolyn Parnell, Minneapolis, MN (US); Michael Skoler, St. Paul, MN (US)

(73) Assignee: Minnesota Public Radio, St. Paul, MN (US)

( * ) Notice: Subject to any disclaimer, the term of this patent is extended or adjusted under 35 U.S.C. 154(b) by 959 days.

(21) Appl. No.: 11/502,160

(22) Filed: Aug. 10, 2006

Related U.S. Application Data

(60) Provisional application No. 60/715,803, filed on Sep. 9, 2005.

(51) Int. Cl.
*G06F 17/30* (2006.01)

(52) U.S. Cl.
USPC .......................................... 707/766; 715/255

(58) Field of Classification Search
USPC .................. 707/3, 104.1, 736, 758, 765–772; 705/26; 715/255, 716, 854; 704/1
See application file for complete search history.

(56) References Cited

U.S. PATENT DOCUMENTS

| | | | |
|---|---|---|---|
| 4,345,315 A | 8/1982 | Cadotte et al. | |
| 5,365,266 A | 11/1994 | Carpenter | |
| 5,371,673 A * | 12/1994 | Fan | 704/1 |
| 5,715,314 A | 2/1998 | Payne et al. | |
| 5,760,771 A * | 6/1998 | Blonder et al. | 715/854 |
| 5,794,207 A | 8/1998 | Walker et al. | |
| 5,812,642 A | 9/1998 | Leroy | |
| 5,948,061 A | 9/1999 | Merriman et al. | |
| 5,960,411 A | 9/1999 | Hartman et al. | |
| 5,974,417 A | 10/1999 | Bracho et al. | |
| 6,151,581 A | 11/2000 | Kraftson et al. | |
| 6,151,584 A | 11/2000 | Papierniak et al. | |
| 6,189,029 B1 | 2/2001 | Fuerst | |
| 6,250,548 B1 | 6/2001 | McClure et al. | |
| 6,275,811 B1 | 8/2001 | Ginn | |
| 6,289,350 B1 | 9/2001 | Shapiro et al. | |
| 6,370,535 B1 | 4/2002 | Shapiro et al. | |
| 6,510,427 B1 | 1/2003 | Bossemeyer et al. | |
| 6,529,911 B1 | 3/2003 | Mielenhausen | |
| 6,549,890 B2 | 4/2003 | Mundell et al. | |
| 6,556,974 B1 | 4/2003 | D'Alessandro | |
| 6,574,614 B1 | 6/2003 | Kesel | |
| 6,766,362 B1 * | 7/2004 | Miyasaka et al. | 709/219 |
| 6,804,675 B1 | 10/2004 | Knight et al. | |
| 6,824,053 B2 | 11/2004 | Bluemer et al. | |
| 6,965,886 B2 | 11/2005 | Govrin et al. | |
| 7,023,646 B2 | 4/2006 | Bahirat | |

(Continued)

*Primary Examiner* — Wilson Lee

(57) ABSTRACT

According to one example embodiment, a computer-based system is provided for collecting, assimilating, and processing large amounts of data to allow journalists to harness wide networks of public sources. The system includes an interactive communication tool, a data-collection analyzer, a public-source database and processor, and a media publication center. The interactive communication tool includes public-directed queries and an input device to collect data provided from the public in response to the public-directed queries, and the collected data is analyzed by the data-collection analyzer. The public-source database and processor stores and retrieves qualified information in response to the interactive communication tool and the data-collection analyzer. The media publication center includes a publicly-accessible interface to disseminate the journalistic pieces that were developed based on the analyzed data.

29 Claims, 2 Drawing Sheets

(56) References Cited

U.S. PATENT DOCUMENTS

| | | |
|---|---|---|
| 7,035,848 B2 | 4/2006 | Shapiro et al. |
| 7,044,375 B2 | 5/2006 | Scott |
| 7,058,710 B2 | 6/2006 | McCall et al. |
| 7,143,089 B2 | 11/2006 | Petras et al. |
| 7,415,456 B2 * | 8/2008 | Benco et al. ............... 1/1 |
| 2001/0037206 A1 | 11/2001 | Falk et al. |
| 2002/0002482 A1 | 1/2002 | Thomas |
| 2002/0010605 A1 | 1/2002 | Dorofeev et al. |
| 2002/0013738 A1 * | 1/2002 | Vistisen ............... 705/26 |
| 2002/0049738 A1 * | 4/2002 | Epstein ............... 707/1 |
| 2002/0059283 A1 | 5/2002 | Shapiro et al. |
| 2002/0065708 A1 | 5/2002 | Senay et al. |
| 2002/0072951 A1 | 6/2002 | Lee et al. |
| 2002/0087385 A1 | 7/2002 | Vincent |
| 2002/0091563 A1 | 7/2002 | Wasa |
| 2002/0107727 A1 | 8/2002 | Traub |
| 2002/0120494 A1 | 8/2002 | Altemuehle et al. |
| 2002/0120501 A1 | 8/2002 | Bell et al. |
| 2002/0123924 A1 | 9/2002 | Cruz |
| 2002/0133392 A1 | 9/2002 | Angel et al. |
| 2002/0174000 A1 | 11/2002 | Katz et al. |
| 2002/0188497 A1 | 12/2002 | Cerwin |
| 2002/0188498 A1 | 12/2002 | Stoloff et al. |
| 2002/0194052 A1 | 12/2002 | Delano et al. |
| 2002/0194112 A1 * | 12/2002 | dePinto et al. ............... 705/37 |
| 2003/0033233 A1 | 2/2003 | Lingwood et al. |
| 2003/0036947 A1 | 2/2003 | Smith et al. |
| 2003/0050814 A1 | 3/2003 | Stoneking et al. |
| 2003/0069780 A1 | 4/2003 | Hailwood et al. |
| 2003/0083924 A1 | 5/2003 | Lee et al. |
| 2003/0101088 A1 | 5/2003 | Lohavichan |
| 2003/0126010 A1 | 7/2003 | Barns-Slavin |
| 2003/0151618 A1 * | 8/2003 | Johnson et al. ............... 345/716 |
| 2004/0006747 A1 * | 1/2004 | Tyler ............... 715/530 |
| 2004/0133393 A1 * | 7/2004 | Misium ............... 702/181 |
| 2004/0203672 A1 * | 10/2004 | Crocker et al. ............... 455/415 |
| 2005/0114324 A1 * | 5/2005 | Mayer ............... 707/3 |
| 2005/0232247 A1 * | 10/2005 | Whitley et al. ............... 370/352 |
| 2005/0240623 A1 * | 10/2005 | Kobza et al. ............... 707/104.1 |
| 2007/0162365 A1 * | 7/2007 | Weinreb ............... 705/35 |

* cited by examiner

COMPUTER-BASED SYSTEM AND METHOD FOR PROCESSING DATA FOR A JOURNALISM ORGANIZATION

RELATED PATENT DOCUMENTS

This patent document claims benefit under 35 U.S.C. §119(e) to U.S. Provisional Patent Application No. 60/715,803 filed on Sep. 9, 2005 and entitled: "Computer-Based System and Method for Processing Data for a Journalism Organization."

FIELD OF THE INVENTION

The present invention relates to computer-based systems for collecting, assimilating, and processing large amounts of data to allow journalists to harness wide networks of public sources. Expanded source networks increase the depth of journalistic content, allow audience participation in journalism and inform coverage decisions of journalism organizations.

BACKGROUND OF THE INVENTION

Journalism has not changed significantly over the last few decades. Decisions about what news to cover are, for the most part, still made by a small group of editors and reporters who develop news stories by speaking to community leaders, topic experts, government officials, and organization spokespeople. Such approaches for developing news stories do not take full advantage of two-way mass-communication tools, such as electronic communication networks, that have become available over the same time span.

Journalists typically tap a relatively limited source pool in preparing their reports. Tools such as open forums, web logs (blogs) and user-written web sites are examples of electronic communication applications that have not been fully exploited and properly utilized by journalism organizations for widening source networks to improve the quality and credibility of journalism. These types of electronic communication tools generally elicit public opinion, rather than information, and have no processes for systematic mining, vetting and managing of sources and information. Journalism organizations mainly use them more for entertainment (e.g., instant polls, citizen stories) and op-ed than for advancing fact-based news reporting. In some cases, journalists attempting to use these electronic communication networks as a source of seemingly news-worthy information have later discovered that the information gleaned, as well as the sources, are not credible. While electronic communication networks have occasionally been used by journalists to expand access to information and ideas, these uses have not been managed in a sustainable way to maintain source relationships and avoid confusing unverified and uncorroborated information with credible information.

Sharing of information over the Internet has demonstrated that knowledgeable people in the public domain can be better informed than reporters about certain aspects of news-worthy stories. Mainstream journalism organizations can produce more accurate, insightful and relevant coverage by drawing on that knowledge. The future of journalism is largely dependent upon the art of identifying, creating and tapping networks of those reliable and knowledgeable people who might not have otherwise stepped forward to offer the information. The participation and insight of these individuals will enrich the content of the stories and help identify emerging trends, overlooked stories or information and new story ideas. Further, journalism organizations can improve the relevance of their coverage by tapping public sources to better understand the assumptions, thought processes, accepted wisdom, and misconceptions of the audience.

The future success of journalism is dependent upon the extent to which organizations can establish and maintain effective, communicative relationships with the wide source networks that new technology, especially the Internet, allows for the first time. These source networks are most useful when the computer-based tools, technology and processes are available to create, manage, vet and mine these networks to find high-caliber sources on any given subject. Therefore, tools for managing these relationships and interactions are needed.

SUMMARY

The present invention is directed to overcoming the above-mentioned challenges and others related to the harnessing of source networks made possible by new technology for the development of journalism. These and other aspects of the present invention are exemplified in a number of illustrated implementations and applications, some of which are shown in the figures and characterized in the claims section that follows.

Various aspects of the present invention are applicable to a system for processing data collected from the public for use in producing journalistic pieces. The system includes an interactive communication tool, a data-collection analyzer, a public-source database and processor, and a media publication center. The interactive communication tool provides public-directed queries and an input device to collect data provided from public sources in response to the public-directed queries, and the collected data is analyzed by the data-collection analyzer. The public-source database and processor stores and retrieves qualified information in response to the interactive communication tool and the data-collection analyzer. The media publication center includes a publicly-accessible interface to disseminate the journalistic pieces that were developed based on the analyzed data.

Other aspects of the present invention are applicable to a method of processing data for use in journalism that is both directed and responsive to the public. The method includes interactively communicating by using public-directed queries and collecting data provided from the public in response to the public-directed queries. The data collected from the public is analyzed and journalism is published based on the analyzed data. Through a public-source database and processor, the method also includes storing and retrieving qualified information related to the steps of interactively communicating and analyzing data collected from the public.

Another example of the claimed invention is directed to a public journalism system using media interaction and audience records. The system includes a plurality of different types of interaction tools, a data processing arrangement, a journalism analyst, and a media publication system or journalism organization (e.g., radio station, television station, website or web-based dissemination including but not necessarily limited to emails, podcasting and Internet radio). The data processing arrangement includes a database of public source records, provided via the different interaction tools, to maintain, categorize and search the public source records. The journalism analyst interacts with the processing arrangement and provides qualified sources and information from the public source records. The journalism organization formulates and publishes pieces of journalism based on the qualified sources and information.

Another example embodiment of the present invention is directed to a system for processing data for a journalism organization using specially-adapted community-authored news sites. The community-authored news sites extend the reach of the journalism organization to community-focused issues.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

DETAILED DESCRIPTION

The present invention is directed to a computer-based approach for collecting, assimilating, and processing large amounts of data to allow journalists to harness wide networks of public sources. In particular applications, aspects of the present invention are directed to enhancing a database of public sources and information for use by broadcast news networks. While the present invention is not necessarily limited to any such journalism systems or networks, various aspects of the invention may be appreciated through a discussion of various examples using this context.

In connection with an example embodiment of the present invention, a system is used to process data collected from the public for use in producing pieces of journalism. The system includes an interactive communication tool, a data-collection analyzer, a public-source database and processor, and a media publication center. The interactive communication tool includes public-directed queries and an input device to collect data provided from the public in response to the public-directed queries, and the collected data is analyzed by the data-collection analyzer. The public-source database and processor stores and retrieves qualified information in response to the interactive communication tool and the data-collection analyzer. The media publication center includes a publicly-accessible interface to disseminate the pieces of journalism that are developed based on the analyzed data.

Figure 1:
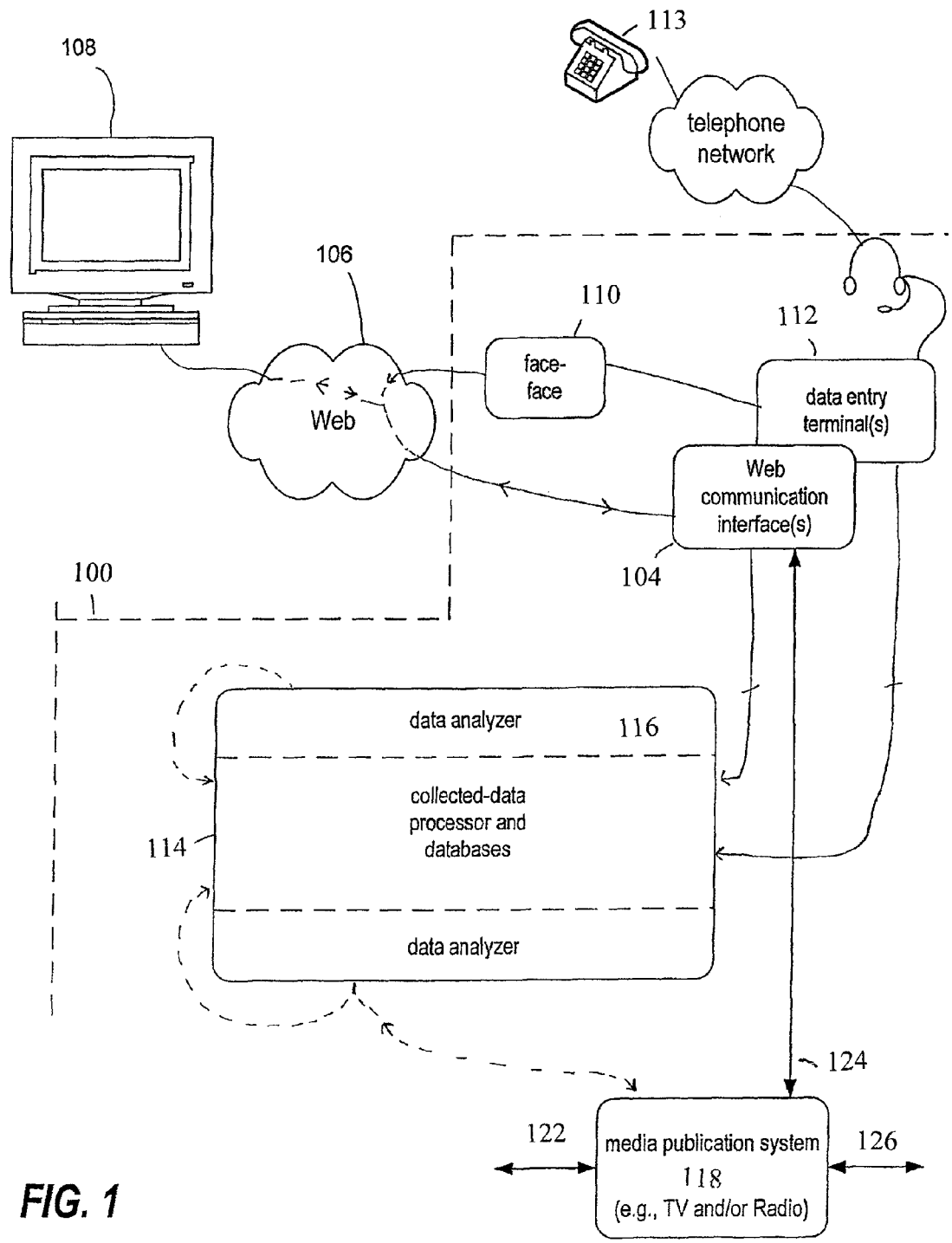
FIG. 1 is a block diagram of a system for developing and producing journalism based on public knowledge and insight, according to one aspect of the present invention.

FIG. 1 illustrates a public-based journalism system 100 according to one example embodiment of the present invention. Data such as public comments, expertise-based insight and occasionally opinion information is collected through the use of a web-communication interface 104. The web-communication interface 104 invites the public to engage in various stories and issues through a range of interactive communication tools such as questionnaires, blogs, quizzes, games, role playing exercises and other simulations presented on the Internet 106, e.g., at a web site. The public can respond via one or any number of these tools by using personal computers 108 to submit the responses to the public-based journalism system 100 via the Internet 106. In addition to the public comments, the Public Insight Journalism system 100 collects demographic data on the responding public. Alternatively, or in response to the public's submitted comments, a journalist can conduct face-to-face interviews, depicted by interface 110, in targeted locations regarding issues identified as important. The data collected from these interviews at interface 110 is also entered into the public-based journalism system 100 through data-entry terminals 112.

For public interaction via one or more conventional telephone networks, the system 100 interfaces with one or more telephone networks via conventional telephone units 113, which also permit data to be entered into data-entry terminals 112, potentially involving human analysts. For manually-operated telephone units 113, data-entry terminals 112 are personal computers conventionally configured with keyboards for placing calls to and receiving calls from the public. These aspects of system 100 collect called-in comments from the public, some of which is solicited and some of which is not. Examples of solicited comments include individuals calling in response to published pieces of journalism or requests made in broadcasts or on the Web, oral responses to manual and/or automated telephone surveys, and callers responding to and/or participating in live talk shows.

In automated telephony applications, data-entry terminals 112 are personal computers equipped with auto-dialing and out-messaging features for providing messages to, or conducting recorded surveys with, selected members of an audience (e.g., subscribers and survey respondents). As discussed further below, the contact information for these selected members is stored and accessed via an appropriately-designated database within a collected-data processor and memory arrangement 114 that, in certain applications, is implemented using at least one CPU and at least one database (e.g., implemented in a central location or deployed in a distributed manner).

In another automated telephony application, data-entry terminals 112 are configured to receive and record calls from the public. This implementation can enhance feedback from talk-show audiences who would like to call in their comments but would rather not interact with a live person, be put on hold waiting to voice their opinions, or voice their response live to the public. If these callers are known public sources (e.g., have previously provided comments) to the news network, their call can be recognized, for example by caller ID or by the caller entering a (push-button) login code. By identifying such a call, the comments fed back to the system 100 are linked with the caller's previously-stored data in a database within the arrangement 114. In more specialized situations, such as talk shows directed to medical topics, these known public sources may be medical experts providing expert-level comments about the medical topic, and their comments are qualified as credible due to the system's recognition of the caller. The quality of the comments can be further corroborated by manually comparing them to other expert-level comments about the medical topic. The system 100 can then use such collected information for instantaneously steering stories and talk shows in response to the comments as well as for developing additional stories and talk shows based on such feedback.

The public-provided data collected via the Web-communication interface 104 and the data entry terminals 112 is sent to the collected-data processor and memory arrangement 114. The collected-data processor and memory arrangement 114 includes a data analyzer 116 that optionally analyzes the collected data as the data is introduced to, or after the data has been stored in, the collected-data processor and memory arrangement 114, or both. While the data analyzer 116 is depicted as a computer-implemented application, one would also recognize that the data analyzer 116 may be a person.

As an option to indicate the quality of input data or of its source, the data analyzer 116 qualifies the collected data or its source by assigning a quality-indicator to the corresponding segment of data in the database. The quality-indicator is based on, for example, the extent to which the source of the data segment is known to be credible such as public sources registered in the system and previous journalistic sources. The qualified data is stored in a plurality of databases for access by the data analyzer 116 or for direct access by users of the system 100. When requested, the qualified data is provided to a media publication center 118 for use in a piece of journalism. The media publication center 118 has a variety of channels, e.g., a radio or TV broadcasting channel 122, a web site news channel 124, podcasts, ROSS feeds, and printed-news distribution channel 126 for disseminating pieces of journalism. Once disseminated, these pieces of journalism are available for public comment, which enters the system in a variety of avenues described earlier, thus creating a positive feedback loop of accumulating public knowledge and sources.

For many applications, electronic mail (e-mail) is used as the primary medium of communication with the system 100. E-mail gives the system an efficient and relatively inexpensive tool for a variety of campaigns. For example, an e-mail can easily cast a wide net to all of the system contacts for feedback as a litmus test for a proposed story or to tap potential experts for a developing series. In another example, targeted e-mails can be sent to a subset of the system's contacts that have already established themselves as knowledgeable in a particular area.

The system 100 collects a wide variety of data from the public sources through different communication tools. In certain embodiments, for example, these tools are presented to the public via the Web-communication interface 104. The type of data collected largely depends upon the tool used. For example, questionnaires and quizzes are framed to obtain focused information, insight and opinion data. When this data is coordinated with the demographic data of the respondents, trends and public assumptions, views and understanding can be discerned, for example, the assumptions or perspectives of different geographical areas or age groups. Similarly, targeted e-mail surveys and face-to-face interviews elicit responses to specific questions. Alternatively, Web logs may be used to cast a wide net for knowledgeable sources.

As examples of interactive communication tools, games and various simulations can be implemented in software via the web-communication interface 104. One such tool is a role-playing simulation that permits an Internet user to play the role of the governor in a state budget-balancing exercise. Available via interface 104 and hosted by the system 100, this exercise allows the public to propose budget modifications to balance a government budget. Such exercises allow individuals to indicate the extent to which they would reallocate, cut, or increase state/national funds directed to different government functions (education, transportation, etc.) and to provide comments on their budget choices. With a sampling of a population engaging in this exercise and communicating their preferred budget plans, the system 100 can collect data that can be interpreted (by journalists using the system 100) to identify assumptions, perspectives and understanding on issues. This collection of data is then used in a variety of ways including, for example: automatically being published by the arrangement 114 at the same website; analyzed (manually and/or via automated tools such as a CPU) to establish coverage priorities based on understanding the public's interest in certain choices or need for further reporting and/or journalistic research; and provided back to the public via the face-to-face interviews at interface 110 for further data collection, processing and journalistic uses. Advantageously, the data collected for such budget-allocation preferences can be automatically processed by the collected-data processor 114 and readily accessed for review. By soliciting comments on budget preferences, this type of tool also facilitates collection of the subjective reasons behind these budget preferences.

Specific examples of these programs may be found at the state level via http://news.minnesota.publicradio.org/projects/2005/03/budget/budget_balancer.php, and at the federal level via http://www.budgetsim.org/nbs. These sites, along with other issue-directed games (or simulations), provide insight to understand public thinking on specific issues and provide an opportunity to collect alternative proposals to address the issues.

According to one embodiment of the invention, a particular one of the databases of arrangement 114 is used to collect data (including user profile data when available) from individual users of the budget-balancing exercise. Via the preferred budget allocations, the system 100 collects data that can be interpreted (by the journalists using the system 100) as a general reflection of the public's assumptions, understanding and views on the importance of various government functions or services.

Another important aspect of the present invention is directed to applications in which a news company's journalists are using the system 100 to develop multiple levels of journalism by combining data that is collected by different types of the above-described input sources. As a specific example, the system 100 collects publicly-provided opinion data from the above-described budget-balancing exercise, via a first database of the arrangement 114. While (or after) this budget choice data is being collected, the results are categorized (e.g., as a percentage of participants opining that more than a certain threshold amount of funds should be allocated to a certain government department) and published via the budget-balancing tool website and via a panel of experts being broadcast via a radio broadcast channel of the media publication center 118. The panel of experts can comment on the assumptions and/or logic underlying the public views. In a particular embodiment and application, via the data-entry terminals 112, employees of the news company are entering data into two additional content repositories in the arrangement 114: one for storing and characterizing the views and observations of each participating expert, and another for storing and characterizing the views and comments of call-in respondents to the broadcast. Other employees of the news company operate as one or more data analyzers for reviewing, editing, identifying and feeding data to the media publication center. This data can be provided concurrent with the broadcast being used to collect the data or in connection with development of pieces to be considered for later publication.

In a more particular embodiment, each public source has profile information (including, e.g., identification, field of expertise, basis of expertise and contact information) stored in one of the databases of arrangement 114. This profile information, particularly the contact information, is used as another channel to communicate data to a selected audience for further expert contributions to pool information on the subject of interest. The arrangement 114 stores such information for further access by the data analyzer(s) as well as personnel serving the media publication center 118.

Figure 2:
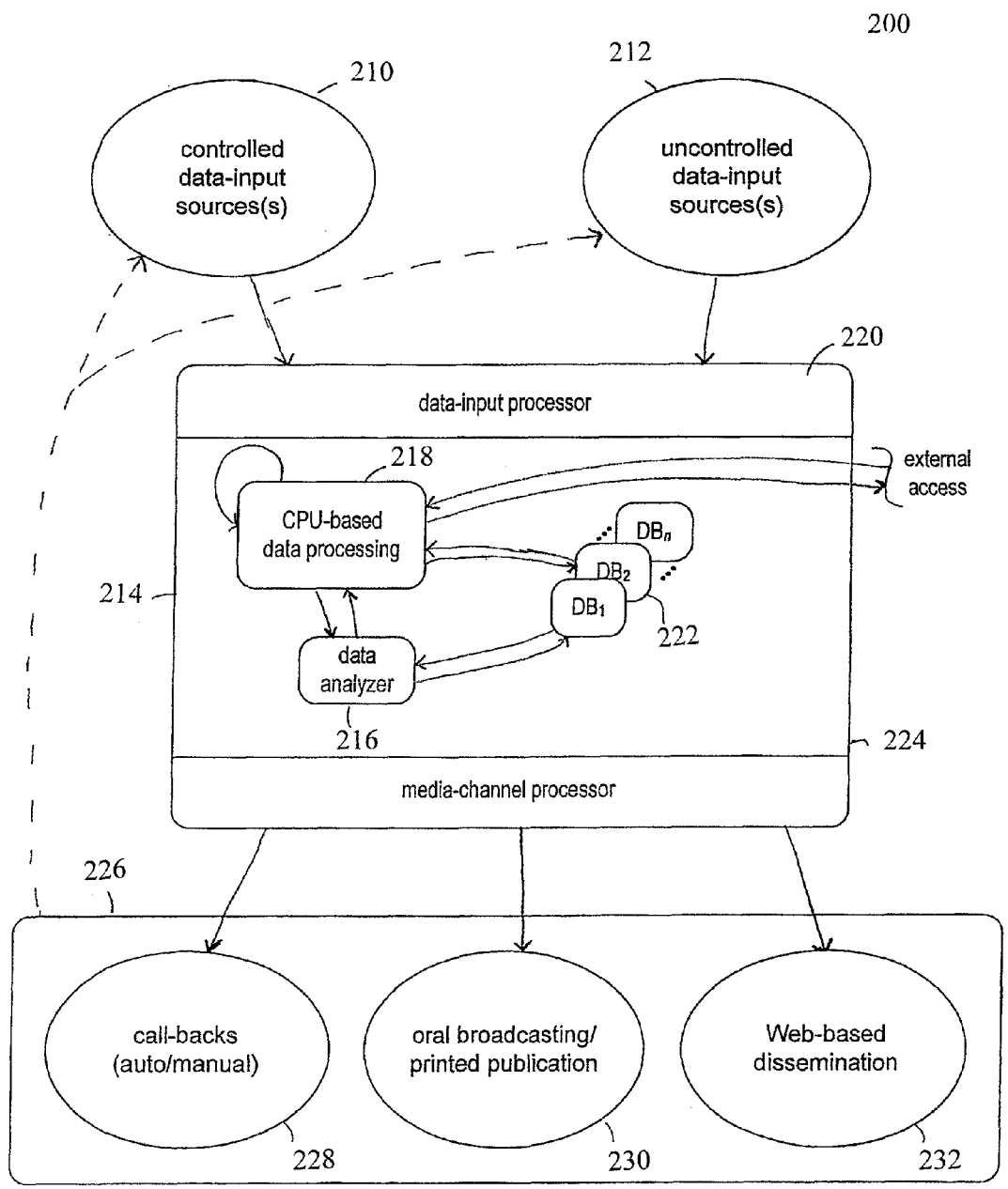
FIG. 2 is a functional diagram of an alternative system for developing and producing journalism based on public knowledge and insight, according to another aspect of the present invention While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

FIG. 2 illustrates a related journalism system 200 according to another example embodiment of the present invention. The system 200 includes two different types of data input sources, controlled data-input 210 and uncontrolled data-input 212. All such data is input and collected for storage and retrieval in a collected-data processor and memory arrangement 214.

Information is processed via a controlled data-input 210 when the information is expected to be formatted in a manner that requires no substantive manual (human) interpretation. Examples of controlled data-input 210 include journalists entering structured data responses from face-to-face interviews and e-mail responses to targeted e-mail surveys that provide structured responses as discussed above. In a more specific embodiment, interactive tools are used for collecting data from the public according to predetermined formats. These predetermined formats require such data to be entered in a controlled manner, with structured entries for ease of automated interpretation by the system 200. These structured entries includes but are not limited to multiple choice and/or entries recognizable by automated recognitions tools such as in audible or typed-word recognition.

Information is processed via an uncontrolled data-input 212 when the information is expected to be entered in a manner that would require substantive human interpretation and/or editing. In certain example embodiments and applications, uncontrolled data-input sources 212 include (pre-qualified) blog entries, call-in comments, unsolicited public comments via phone, e-mail or other web communication, some data (e.g., comments) gleaned from interactive communication tools such as role-playing exercises and games, responses to quizzes and questionnaires, and general feedback and comments from the public, known public sources, and qualified sources. Regardless of the type of data-input source, all data is inputted to a collected-data processor and memory arrangement 214.

By separating controlled data-input sources from uncontrolled data-input sources, the system 200 (as well as the system 100 of FIG. 1) can readily steer the appropriate types of data to the appropriate types of data analyzers. For instance, one implementation of a purely-automated data analyzer (116 of FIG. 1 or 216 of FIG. 2) can readily edit data being input for storage by performing less-complex tasks such as spell checks, topic relevance (e.g., number of occurrences of key words), grammar correction, public source name reconciliation, verification of caller phone number and name, and characterization for input data representing structured data (e.g., input data is flagged as being from a person over the voting age of 18 and supporting a tax increase for education). As it would be burdensome to configure an automated computer application to accurately identify new issues and/or interpret comments that might readily suggest a certain view on the topic of interest, a more robust data analyzer 216 involves a human. With human involvement, the data analyzer 216 reviews and accurately assesses and operates on the data before (and often after) storage in one or more of the databases 222 of the collected-data processor and memory arrangement 214.

The collected-data processor and memory arrangement 214 includes a data-input processor 220, a data processor 218, a data analyzer 216, a plurality of databases 222, and an optional media-channel processor adapted to provide a variety of data-assimilation tasks (e.g., word searching, reports on history and/or basis of qualification of news stories or sources of news stories) 224. The collected data is processed by the data-input processor 216 where the data is reviewed, validated, and optionally modified to present the data in a useful configuration. Once the collected data is entered into the system, it is accessible to each of the data processor 218, data analyzer 216, and plurality of databases 222, as well as to the media-channel processor 224.

The processor 218 performs a variety of operations on the collected data including, for example, sorting, searching, and extracting. The collected data is stored in a plurality of general and specific databases 222. For example, a specific database 222 may be created for storing the results from one specific survey. The data analyzer 216 ensures that the collected data is credible and assigns a quality-indicator to each piece of data. The quality-indicator identifies for a data-user the level of reliability to place on the data, e.g., a lower quality-indicator would signify less confidence in the source and indicate that further data sources should be consulted. The media-channel processor 224 interfaces with the media-channel output. For example, the media-channel processor can request specific data from the collected-data processor and memory arrangement 214 for delivery to the media-channel output 226. Examples of media-channel output are automated informative phone calls (228), such as to respondents of a survey to indicate that the survey results are available for access; e-mail; broadcast channels (230) such as radio, television; printed media and Web-based publishing and broadcasts (232) such as "podcasts" (i.e., web-based broadcasts that are downloaded into a handheld or other terminal for playback purposes) or RSS feeds.

The credibility of the data input to the arrangements discussed above with FIGS. 1 and 2 involve another important aspect of the present invention. Sources of credible data among participants can be identified by the breadth and quality of information provided in the past, credentials, and prior experience with or knowledge of the source, which also indicates whether a source should be considered as a more permanent and/or ongoing resource. These characteristics distinguish certain public respondents into at least two categories: respondents and contacts. Respondents are persons who interact with the system, for example, through the use of online simulations or as an online survey respondent. While the information garnered from these interactions is valuable for providing information and creating content, the decision to use them as ongoing contacts for the news company using the system (e.g., 100 of FIG. 1) lies in the hands of analyzers (or analysts as the case may be for the particular implementation).

Contacts are individuals who interact with the system at a deeper level than the respondents. In this regard, a contact would have special expertise as discussed above. Contacts are likely to have had direct contact by phone or face-to-face with reporters or newsroom analysts due to information provided in earlier requests. In any case, these are people with special status as high-potential future sources on given topics.

In various implementations of the above-described systems, the system would not only provide for storage of basic personal information on public sources, but would also allow the following:

Activity logging enables each public source's interactions with the system to be recorded, assessable, and searchable.

Categorization and sorting allows the system to assemble groups of sources for further follow up, easier searching, and administrative usability.

Extensive search capability enables the system to efficiently retrieve public sources whose records fit a variety of criteria.

Sources may ensure their personal information is up to date through the use of a secure, web form.

Import functionality is required to pull contacts into the system from external sources.

Export and reporting functionality is needed to produce usable documents for the newsroom or media publication center.

Workflow processes could trigger passive events such as reminders to the system analysts or as a time-delayed "thank you" to participants.

Another aspect of the claimed invention is directed to a system for processing data for a journalism organization using specially-adapted community-authored news sites, for example, to extend the reach of one of the above-described systems (100 or 200) or; alternatively, to extend the reach of another type of journalism-data-processing system. The community-authored news sites are developed or written by members of the respective geographic communities and may be edited by a local community member and/or by someone affiliated with one of the above-described systems. In such a processing system, one of the respective editors' objectives is to ensure that the sites are limited to local issues. One of the above-mentioned journalism-data-processing systems has a Web link, or other private electronic link, to access to monitor the community-authored news sites and develop stories therefrom.

Yet another application of the present invention uses one of the above-described systems (100 or 200) to spur public discussion on important social issues by allowing people to learn about an issue, propose solutions to a social problem and/or comment and rate ideas proposed by others. A forum is created online, where one issue is selected for discussion. The forum participants are educated on the issue, either previously or through participation in the forum, and then allowed to debate different proposals that address the issue. This forum is monitored by a data analyzer that regularly reports unique ideas, examples, and sources generated in the forum (to one of the above processing databases and/or to a media publication center). Journalists at the media publication center receive these highlighted aspects of the forum discussion and develop pieces of journalism based upon those aspects. This application also facilitates decision-making processes, such as government legislation, by culminating in town hall-type meetings or news coverage where the best and/or most highly-rated generated ideas are presented. These meetings may also be broadcast by the journalism organization, thereby perpetuating the feedback loop.

One specific working example of this application focuses on solving the gap in student standardized test scores between white and minority students. The online forum complements a multipart radio series. The collaborative online forum is promoted on the radio, on the Web, through publicity and through parent, education and other organizations that link to the site. The online forum can prompt a town hall meeting where a live audience proposes ideas to the superintendents of metropolitan school systems and a state education commissioner. The town hall meeting is recorded and broadcast by the media publication center. A significant benefit and goal of the application is to put the journalism organization in contact with people who may not otherwise have been consulted on the issue, e.g, minority groups, people from inner-city neighborhoods, parents of kids who were experiencing the achievement gap, etc. Such applications are applicable to a wide variety of issue-focused discussions.

While certain aspects of the present invention have been described with reference to several particular example embodiments, those skilled in the art will recognize that many changes may be made thereto without departing from the spirit and scope of the present invention which is set forth in the following claims.

What is claimed is:

1. A system for processing data for a journalism organization, the system comprising:
   an interactive communication tool including public-directed queries and including an input device to collect data provided from the public in response to the public-directed queries;
   a data-collection analyzer configured and arranged to analyze and to qualify the data collected from the public and, therefrom, provide qualified information;
   a public-source database and processor configured and arranged to store and retrieve the qualified information in response to the interactive communication tool, and the data-collection analyzer and to create journalism that includes the qualified information; and
   a media publication center including a publicly-accessible interface to publish the created journalism by presenting the qualified information in a form that is viewable to an observer of the journalism, thereby providing the journalism that at least in part includes the qualified information.

2. The system of claim 1, wherein the interactive communication tool includes an automated computer-executed tool adapted to solicit public opinion information concerning government responsibilities and wherein the qualified information includes the solicited public opinion information.

3. The system of claim 1, wherein the interactive communication tool includes an automated computer-executed tool adapted to solicit public opinion information concerning issues of local interest; and to coordinate demographic data of respondents providing the public opinion information with their response data, and wherein material taken from the qualified information includes the solicited public opinion information and the coordinated demographic data.

4. The system of claim 1, wherein the interactive communication tool includes a Web e-mail interface.

5. The system of claim 1, wherein the interactive communication tool includes an automated computer-executed tool adapted to solicit public views via a web-based gaming interaction and to coordinate the solicited public views and demographic data of users of the tool to include, as part of the created journalism, trends representing assumptions or perspectives of different geographical areas.

6. The system of claim 1, wherein the interactive communication tool includes an automated interface adapted to permit a public user of the system to provide ideas, comments and ratings.

7. The system of claim 1, wherein the interactive communication tool includes an automated interface adapted to permit a public user of the system to provide comments in response to publications provided via the interactive communication tool.

8. The system of claim 1, wherein the interactive communication tool includes an automated subscriber interface adapted to permit a subscriber to the system to provide unsolicited comments.

9. The system of claim 1, wherein the data-collection analyzer is configured and arranged to receive input from a journalist, the input representing a qualification of the collected data by the journalist.

10. The system of claim 1, wherein the data-collection analyzer includes a data-processing filter to compare and qualify the collected data automatically.

11. The system of claim 1, further including a database to store information provided from the interactive communication tool.

12. The system of claim 1, wherein the media publication center includes a radio system for distributing news stories based on data acquired from public sources using the interactive communication tool.

13. The system of claim 1, wherein the media publication center includes a radio station for broadcasting news stories based on the retrieved qualified information.

14. The system of claim 13, wherein the retrieved qualified information is based on acquired information that is qualified by the data-collection analyzer.

15. The system of claim 12, wherein the data-collection analyzer retrieves information from the public-source database and processor, and then reviews and provides newsworthy information to the media publication center for publication.

16. A method of processing data for a journalism organization, the method comprising:
interactively communicating by using public-directed queries and collecting data provided from the public in response to the public-directed queries;
analyzing data collected from the public;
publishing journalism based on the analyzed data and by presenting the analyzed data in a form that is viewable to an observer of the journalism, thereby providing the journalism at least in part including representations of the analyzed data; and
via a public-source database and processor (AIR), storing and retrieving qualified information in response to the steps of interactively communicating and analyzing data collected from the public.

17. A system for processing data for a journalism organization, the system comprising:
means for interactively communicating by using public-directed queries and collecting data provided from the public in response to the public-directed queries;
means for analyzing and qualifying data collected from the public;
means for publishing journalism based on the analyzed and qualified data, the published journalism thereby being formulated at least in part to include representations of the analyzed and qualified data; and
means for storing and retrieving qualified information in response to the means for interactively communicating and the means for analyzing and qualifying data collected from the public.

18. For public journalism using media interaction and audience records, a journalism system comprising:
a plurality of different types of interaction tools;
a data processing arrangement, including a database of audience-based records, provided via the different types of interaction tools to maintain, categorize and search the audience-based records;
a journalism analyst, involving a human, to interact with the processing arrangement and provide qualified ones of the audience-based records; and
a broadcast journalism organization to formulate and publish journalism pieces that include information displaying the qualified ones of the audience-based records, the published journalism pieces thereby being formulated to include the qualified ones of the audience-based records.

19. The system of claim 18, wherein one of the interaction tools provides data in response to the published journalism pieces.

20. The system of claim 18, wherein the processing arrangement qualifies the records based on a confidence level computation indicator.

21. The system of claim 20, wherein the confidence level computation is a function of a source qualifier corresponding to a particular journalism topic.

22. The system of claim 20, wherein the confidence level computation is a function of an input provided by the journalism analyst.

23. The system of claim 1, wherein the system is configured to use the data-collection analyzer to provide an indication of credibility or trustworthiness of the data collected from the public, and wherein the interactive communication tool, data-collection analyzer, public-source database and processor, and media publication center are configured to operate on and process data collected from the public for use in producing pieces of journalism and to provide the produced pieces of journalism to a publicly-accessible interface for dissemination thereof.

24. A system for processing data for a journalism organization, the system comprising:
an interactive communication tool configured and arranged to provide public-directed queries and including an input device to collect data provided from the public in response to the public-directed queries, the collected data characterized as including at least one of public opinions or comments on issues and incidents for stories;
a data-collection analyzer configured and arranged to analyze and to qualify the data collected from the public and, therefrom, provide qualified information that includes the data collected from the public and a quality-indicator for the data collected from the public;
a public-source database and processor configured and arranged to store and retrieve the qualified information in response to the interactive communication tool, the data-collection analyzer and the quality indicator and to create journalism that displays material taken from the qualified information; and
a media publication center including a publicly-accessible interface to publish journalism that includes representations of the qualified information based upon the quality indicator.

25. The system of claim 24, wherein data-collection analyzer is configured to determine the quality indicator based upon at least one of credentials of individuals that provide the data and demographic data about the individuals.

26. The system of claim 1, wherein material taken from the qualified information includes community authored-news collected from the public.

27. The system of claim 1, wherein material taken from the qualified information includes opinion information collected from the public.

28. The system of claim 1, wherein material taken from the qualified information includes opinion information collected from the public and community authored-news collected from the public.

29. The system of claim 1, wherein the interactive communication tool includes an automated computer-executed tool adapted to solicit public opinion information concerning issues of local interest; and to coordinate demographic data of respondents providing the public opinion information with their response data, and wherein material taken from the qualified information includes the solicited public opinion information, the coordinated demographic data and community authored-news collected from the public.

* * * * *